United States Patent [19]

Reichel

[11] 4,403,839

[45] Sep. 13, 1983

[54] COMPARATOR MACROSCOPE OR MICROSCOPE

[75] Inventor: Artur Reichel, Wetzlar, Fed. Rep. of Germany

[73] Assignee: Ernst Leitz Wetzlar GmbH, Wetzlar, Fed. Rep. of Germany

[21] Appl. No.: 236,240

[22] Filed: Feb. 20, 1981

[30] Foreign Application Priority Data

Feb. 22, 1980 [DE] Fed. Rep. of Germany ....... 3006657

[51] Int. Cl.³ ...................... G02B 21/20; G02B 21/36
[52] U.S. Cl. .................................................. 350/514
[58] Field of Search ....................... 350/19, 30, 33, 35, 350/91

[56] References Cited

U.S. PATENT DOCUMENTS

| 3,421,806 | 1/1969 | Weber | 350/91 X |
| 3,615,124 | 10/1971 | Blankenburg | 350/30 X |
| 3,734,593 | 5/1973 | Mori | |
| 3,785,714 | 1/1974 | Hock et al. | 350/30 X |
| 3,851,949 | 12/1974 | Kraft et al. | 350/33 X |

FOREIGN PATENT DOCUMENTS 2423136 11/1977 Fed. Rep. of Germany .
1569393 4/1969 France .................................. 350/30

Primary Examiner—John K. Corbin
Assistant Examiner—Matthew W. Koren
Attorney, Agent, or Firm—Schwartz, Jeffery, Schwaab, Mack, Blumenthal & Koch

[57] ABSTRACT

Disclosed is a comparator viewing device for simultaneously viewing objects to be compared, either macroscopically or microscopically, comprising a comparator bridge member, a pair of individual optical viewing members attached to the bridge member, each of the viewing members comprising at least one objective, a binocular tube mounted on the bridge member, the binocular tube including two eyepieces and a beam splitter interposed in a beam path between the objects to be viewed and the eyepieces, and a marking device comprising a light-emitting surface for producing a luminous spot on the objects to be viewed, this marking device being located in the beam path on the side of the beam splitter opposite the objects to be viewed, whereby the same beam path serves for viewing of the objects and also for producing the luminous spot on the objects to be viewed, and the luminous spot is always produced on the location of the object which appears in the center of the field of vision. The viewing device optionally includes a phototube mounted on the bridge member for simultaneously photographing the objects to be viewed.

6 Claims, 4 Drawing Figures

U.S. Patent   Sep. 13, 1983   Sheet 2 of 2   4,403,839
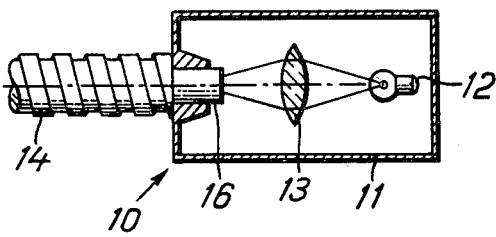
Fig. 2
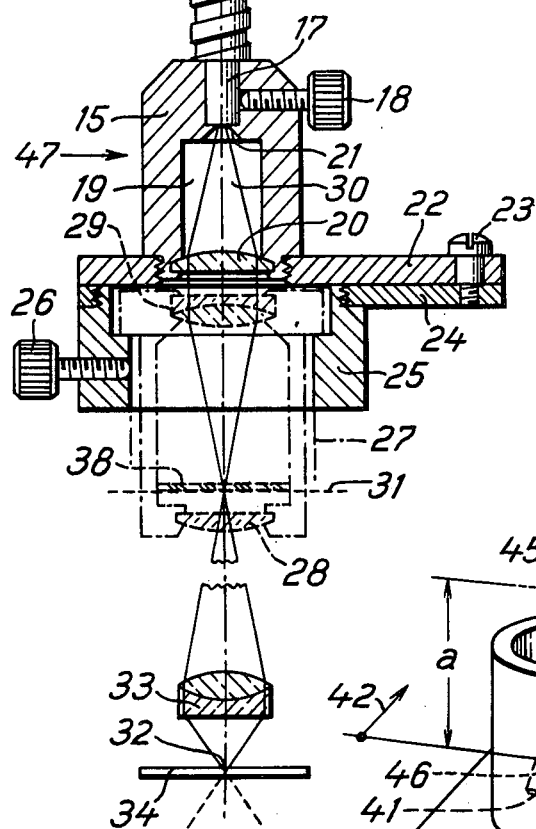
Fig. 3
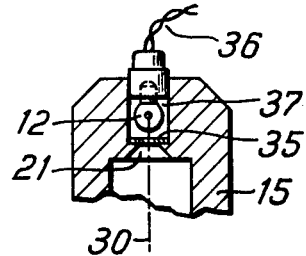
Fig. 4
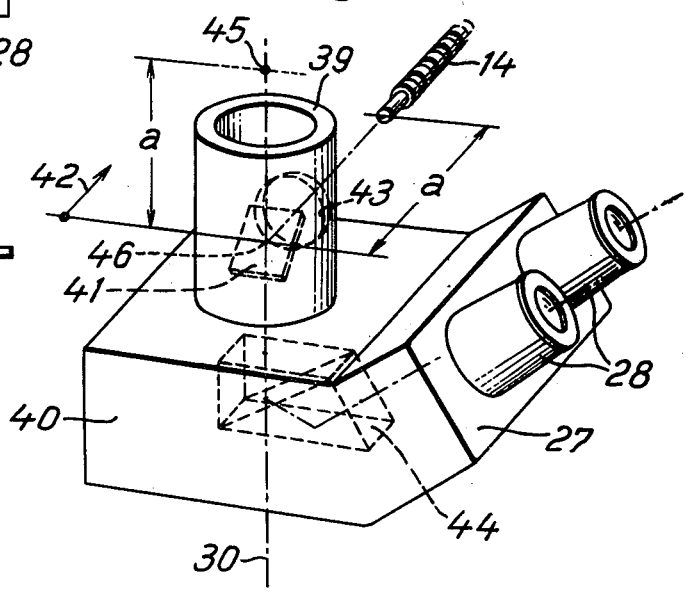

COMPARATOR MACROSCOPE OR MICROSCOPE

BACKGROUND OF THE INVENTION

The present invention pertains to a comparator macroscope or microscope for the simultaneous observation and optional photographic imaging of objects to be compared, comprising a comparator bridge for the bilateral attachment of individual macroscopes or microscopes, respectively, or of macro- or micro-objectives, a binocular tube mounted on the comparator bridge and having a beam splitter prism, a phototube arranged on the binocular tube and a marking device producing a luminous spot on the objects.

Comparator macroscopes of this type and comparator microscopes of a similar design are used, for example, in criminology, as well as in biology, medicine and industry, for comparative examinations of two different objects and also together with suitable instrumental equipment to photograph these objects. During alignment of the objects, it is often highly time-consuming to arrange the location of interest in the center of the field of vision. This is especially true when highly magnifying lenses are used, and in the examination of documents. When lenses with different parfocalizing lengths are mounted on a revolving turret, refocussing by means of the adjustment of the comparator bridge is always necessary in case of a lens change. Since there are no outwardly recognizable indications of the direction wherein the refocussing is to take place, the process is often laborious.

A multiple microscope is known from U.S. Pat. No. 3,734,593, wherein two or more observers may simultaneously observe an object by means of suitably coupled stereomicroscopes. In this device, a luminous spot is produced on the object with the aid of a fixedly installed illuminating device, and this luminous spot serves to mark the location on the object viewed simultaneously by the observers. The indicating device is adjustably vertically, whereby the size of the luminous spot may be varied. If during the viewing of the object the two fields of vision of the microscopes do not coincide, the luminous spot does not appear in the center of the field of vision of each microscope. This indicates the fact that the microscopes are focussed at different locations of the object. It is not possible with this known apparatus to examine simultaneously two different objects which are to be compared with each other, and it is immaterial in this case, since merely the degree of coincidence of the position of a certain location on the object is to be determined and no comparison is intended. Furthermore, in this apparatus, in addition to the observation light paths, a separate light path must be provided for the generation of the luminous spot, at a corresponding additional cost.

Another stereomicroscope is known from DE-AS No. 24 23 136, wherein a luminous spot is produced on the object by means of an additional focussing beam. The luminous spot is reproduced by the stereo system in intermediate imaging planes, superposed on the observation light path and then separated from the latter. Any axial displacement of the object plane defined by the luminous spot is converted by photoreceivers into a direction-dependent signal, which serves to control a focussing motor. In this manner, it is achieved that the plane of sharpness of the objectives always coincides with the object. This automatic focussing device is suited only for stereomicroscopes because of the two principal beams situated at a certain angle of convergence with respect to each other. A simultaneous observation of two objects to be compared with each other is not possible with this apparatus, which is also expensive in its design.

SUMMARY OF THE INVENTION

It is therefore an object of the present invention to provide an improved comparator macroscope or microscope.

Another object of the invention is to provide a comparator macroscope or microscope of the above-described type which facilitates not only the finding of definite locations on objects to be compared, but also focussing, in particular when lenses having different parfocalizing lengths and mounted on a revolving turret are used.

It is a further object of the invention to provide a comparator macroscope or microscope which accomplishes the foregoing objects without the need for complicated and expensive equipment.

In accomplishing the foregoing objects, there has been provided in accordance with the present invention a comparator viewing device for simultaneously viewing objects to be compared, either macroscopically or microscopically, comprising a comparator bridge member, a pair of individual optical viewing members attached to the bridge member, each of the viewing members comprising at least one objective, a binocular tube mounted on the bridge member, the binocular tube including two eyepieces and a beam splitter interposed in a beam path between the objects to be viewed and the eyepieces, and a marking device comprising a light-emitting surface for producing a luminous spot on the objects to be viewed, the marking device being located in the beam path on the side of the beam splitter opposite the objects to be viewed, whereby the same beam path serves for viewing of the objects and also for producing the luminous spot on the objects to be viewed, and the luminous spot is always produced on the location of the object which appears in the center of the field of vision.

In a preferred embodiment, the device further comprises a phototube arranged on the binocular tube for simultaneous photographing of the objects being viewed.

According to one embodiment, the marking device is mounted on one of the eyepieces and comprises a mounting member adapted for detachable mounting on the eyepiece and an upper member for supporting the light-emitting surface, the upper member being pivotably attached to the mounting member, so that the marking device is selectively movable into and out of the beam path.

In accordance with another embodiment, the marking device is mounted on the phototube.

Further objects, features and advantages of the present invention will become apparent from the detailed description of preferred embodiments which follows, when considered in view of the attached figures of drawing.

BRIEF DESCRIPTION OF THE DRAWINGS

In the drawings:

FIG. 2 is a longitudinal cross-sectional view through a first embodiment of a comparator macroscope according to the invention, with a marking device attached thereto;

FIG. 3 is a longitudinal cross-sectional view through a further embodiment of the marking device, shown only partially; and FIG. 4 is a perspective view, partially in section, of a further embodiment of the marking device according to the present invention.

DETAILED DESCRIPTION OF PREFERRED EMBODIMENTS

Figure 1:
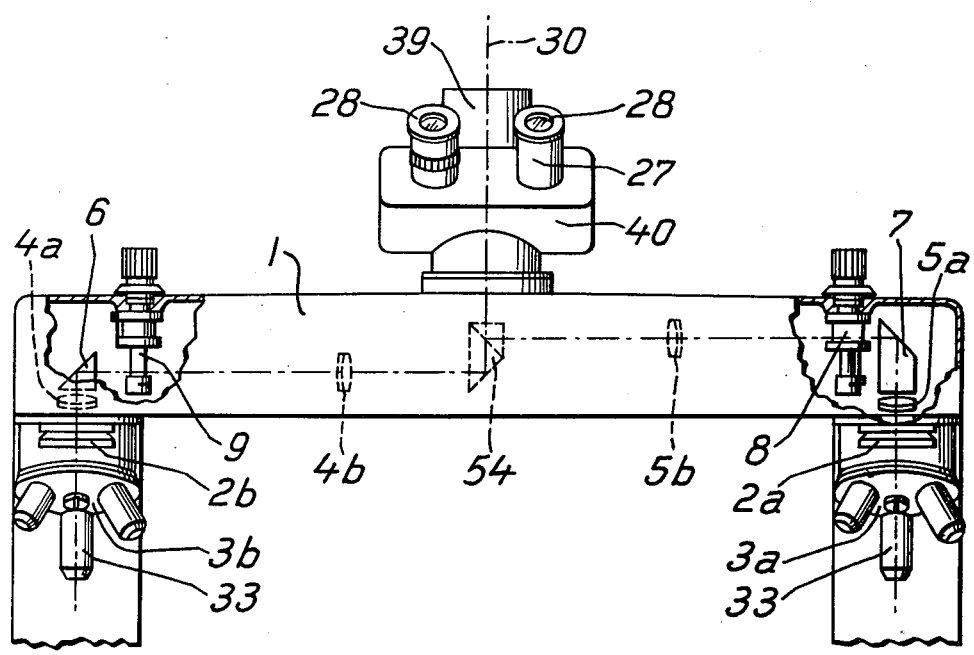
FIG. 1 is a plan view partially in section, of a comparator microscope, without an attached marking device.

According to the invention, a device is provided which may be coupled in the light beam in front of the beam splitter prism, as viewed from the direction of the observer, as an added accessory. The same light beam is used for observation and for the reproduction of the luminous spots, whereby the luminous spots are always reproduced on the location of the objects appearing in the center of the prevailing field of vision. The luminous spots are thus simultaneously projected onto the two objects by means of two light beams produced in the comparator bridge, because the marking device is arranged in front of the beam splitter prism. During refocussing after a change of lenses, the object will be approximately in the focal plane, when in the course of the adjustment of the comparator bridge in the focussing direction the luminous spot reproduced on the object is at its smallest diameter. During the alignment of the objects, their observation through the ocular is thus eliminated, it being sufficient to directly determine the variation of the diameter of the luminous spots.

In accordance with one preferred embodiment of the invention, it is sufficient to clamp onto the eyepiece holder the part of the marking device defining the light-emitting surface, in order to mount the marking device. If the upper part of the marking device is rotatable out of the beam path, it can be used in a simple manner with one of the two observation eyepieces, without it being necessary to remove the entire marking device during the comparison of the objects, in each individual case.

Advantageously, the marking device may be fastened with its light-emitting surface part to the phototube and be equipped with a circular diaphragm in the focal plane of a positive lens. Between the positive lens and the ocular lens of the eyepiece there exists then a telecentric beam and the diaphragm is reproduced in the field of vision plane of the eyepiece to which the marking device is attached.

According to another preferred embodiment, one eyepiece of the binocular tube is provided with an exchangeable graticule. In addition to the marking of the center of the object by the luminous spot, the observable object diameter for the eyepiece/lens pairing in use is projected onto the object surface, with a collector system which increases the light-emitting surface being provided for the purpose. It is readily apparent that, depending on the field of application, graticules with different grating patterns may be used.

Alternatively, in keeping with another embodiment of the invention, the marking device may include an optical structural part which deflects its beam, with this optical part being arranged displaceably in the phototube. At this optical part, a fully reflecting flat mirror or a glass prism may be used, which are removed from the light path during photographing. The optical structural part deflects the beam emitted by a flexible optical conductor at right angles, whereby a reduced image of the emitting surface of the optical conductor is projected as a luminous spot on the surface of the object.

In the drawing, three exemplary embodiments of the invention are schematically represented. They are described hereinbelow in more detail.

The comparator microscope illustrated in FIG. 1 comprises as its essential components a carrier-like comparator bridge 1, on both ends of which coupling devices 2a, 2b are provided for connecting conventional lens turrets 3a, 3b having lenses 33. Two similar optical systems 4a, 4b and 5a, 5b are arranged in the comparator bridge, each of which produces a 1:1 reproduction. In order to cause coincidence of the two partial light paths, a refracting prism 6, 7 is provided behind (in the direction of light travel) each of the first elements 4a, 5a of the respective optical systems. A beam splitter prism 54 is arranged between the second two elements 4b, 5b of the respective optical systems in such a manner that the two partial light paths are caused to coincide congruently on its splitting surface. Above the beam splitter prism 54, on the comparator bridge 1 is mounted a binocular tube 40 having an eyepiece support 27 and two ocular lenses 28. A phototube 39 is attached to the outer surface of the binocular tube 40. In the planes of the first intermediate images, adjustable half apertures 8, 9 are provided.

FIG. 2 shows the optical light path of a comparator macroscope according to the invention, with the accessory parts required for the attachable marking device 10. The marking device 10 here consists essentially of a cylindrical housing 11, wherein a source of light 12 and a lens 13 are arranged, a flexible optical conductor 14 and a socket-shaped connecting piece 15. The optical conductor 14 protrudes with its entry terminal 16 into the housing 11 and may be secured with its exit terminal 17 by means of a clamping screw 18 in the connecting piece 15. The latter has a cylindrical internal space 19, which is closed off at its lower end by a positive lens 20. A diaphragm 21 is exchangeably arranged in the focal plane of the positive lens. The connecting piece 15 is rigidly mounted on a pivotable plate 22 and may be rotated with the plate as the upper part 47 thereof around an axle member 23, the lower end of which is secured to a bearing plate 24. The latter is connected with a cylindrical clamping sleeve 25. By means of a knurled screw 26, the sleeve 25 may be clamped to the eyepiece holder 27 of an eyepiece 28, shown by broken lines.

The light emitted by the light source 12 is focussed by the lens 13 onto the inlet surface of the flexible optical conductor 14 and passed to the outlet end of said conductor in order to illuminate the removable diaphragm located there. As the latter is located in the focal plane of the positive lens 20, a telecentric beam 30 is obtained between said positive lens 20 and eyepiece lens 29 (shown by broken lines) of the eyepiece 28.

The diaphragm 21 is thereby reproduced in the field of vision plane 31 of the eyepiece 28, and a luminous spot 32 is projected onto an object 34 by means of objective 33, which is only schematically indicated without the conventional supporting structure.

In the embodiment of the invention shown in FIG. 3, the diaphragm 21 is illuminated directly by means of the light source 12 and a subsequent ground glass plate 35. The light source 12 is connected with a power supply line 36, the ground glass plate 35 and the diaphragm 21 arranged in front of the ground glass plate in the light path 30 are here placed in a cylindrical recess 37 of the connecting piece 15.

For the projection not only of the marking of the center of the object, but also of the observable object diameter for the combination of the eyepiece 28 and the objective 33 in use, a graticule 38, known by itself and exchangeable, is provided in the eyepiece 28 at the height of its field of vision plane (FIG. 2), which in this instance has a translucent grating pattern on a non-translucent base. It is obvious that graticules with different grating patterns, such as, for example, cross hairs, may be used.

Another possible embodiment of the invention is shown in FIG. 4. In a phototube 39, mounted on the surface of a binocular tube 40, there is arranged an optical structural part 41 deflecting the beam 30 by 90°, for example, a fully reflecting flat mirror or a prism.

The optical structural part 41 may be displaced in the direction of the arrow 42, so that it may be removed from the beam 30 through an orifice 43 in the phototube 39 for photographic imaging. In the binocular tube 40, which carries the eyepiece 28, a beam splitter prism 44 for both eyepieces 28 is arranged below the optical structural part 41.

The image of an object produced by an objective (not shown) is generated in an intermediate image plane 45. Corresponding to the distance "a" between the reflection center 46 of the optical structural part 41 and the intermediate image plane 45, the output surface of the flexible optical conductor 14 is arranged at the same distance "a" from the reflection center 46 of the optical structural part 41, but at right angles to it. Then, if the inlet surface of the flexible optical conductor 14 is illuminated, a reduced image of the output surface of the optical conductor 14 is produced on the surface of the object to mark its center, when the optical structural part 41 is in its reflecting position. It is obvious that, here again, the direct illumination described with reference to FIG. 3 may also be used.

The embodiments shown in the drawing and described hereinabove represent, as mentioned earlier, merely preferred examples of the invention. The invention is not restricted to them. Rather, numerous other embodiments of the invention are possible. Thus, it is conceivable, for example, to arrange colored glass plates in the path of light and thereby to produce colored luminous spots. The use of monocular tubes instead of binocular tubes is also possible.

What is claimed is:

1. A comparator viewing device for simultaneously viewing objects to be compared, either macroscopically or microscopically, comprising:
   a comparator bridge member arranged therein at each end thereof one of two similar optical systems, each of said optical systems including first and second optical elements and a refracting prism located between said first and second optical elements, each of said optical system providing a partial beam path and wherein the partial beam paths of said optical systems are brought together by means of said refracting prisms in said optical systems, said comparator bridge further comprising a first beam splitter prism provided between the second elements of said two optical systems for uniting the two partial beam paths in congruently superposed fashion on its splitter surface to provide a combined beam path;
   a pair of individual optical viewing members attached to the two ends of said bridge member, each of said viewing members comprising at least one objective lens;
   a binocular tube mounted on said bridge member in the combined beam path of said first beam splitter prism, said binocular tube carrying two occular lenses simultaneously lying in said combined beam path and being mounted on occular supports; and
   a marking device comprising a light-emitting surface for producing a luminous spot on the objects to be viewed, said marking device being located in the combined beam path on the side of said first beam splitter opposite the objects to be viewed, whereby the same beam path serves for viewing of the objects and also for producing the luminous spot on the objects to be viewed, and the luminous spot is always produced on the location of the object which appears in the center of the field of vision, wherein said marking device is mounted on one of said occular supports and comprises a mounting member adapted for detachable mounting on said occular support and an upper member for supporting said light-emitting surface, said upper member being pivotably attached to said mounting member so that the marking device is selectively movable into and out of the beam path of the respective occular lens.

2. A comparator viewing device for simultaneously viewing objects to be compared, either macroscopically or microscopically, comprising:
   a comparator bridge member having arranged therein at each end thereof one of two similar optical systems, each of said optical systems including first and second optical elements and a refracting prism located between said first and second optical elements, each of said optical systems providing a partial beam path and wherein the partial beam paths of said optical systems are brought together by means of said refracting prisms in said optical systems, said comparator bridge further comprising a first beam splitter prism provided between the second elements of said two optical systems for uniting the two partial beam paths in congruently superposed fashion on its splitter surface to provide a combined beam path;
   a pair of individual optical viewing members attached to the two ends of said bridge member, each of said viewing members comprising at least one objective lens;
   a binocular tube mounted on said bridge member in the combined beam path of said first beam splitter prism, said binocular tube carrying two occular lenses simultaneously lying in said combined beam path;
   a marking device comprising a light-emitting surface for producing a luminous spot on the objects to be viewed, said marking device being located in the combined beam path on the side of said first beam splitter opposite the objects to be viewed, whereby the same beam path serves for viewing of the objects and also for producing the luminous spot on the objects to be viewed, and the luminous spot is always produced on the location of the object which apears in the center of the field of vision;
   a phototube mounted on said binocular tube in such a way as to mount a camera device in said combined beam path from said first beam splitter prism; and wherein said marking device is mounted on said phototube so that said light-emitting surface is exposed to said combined beam path.

3. A comparator viewing device as defined in claim 1, further comprising a phototube mounted on said binocular tube in such a way as to mount a camera device in said combined beam path from said first beam splitter prism.

4. A comparator viewing device as defined in claim 1 or 2, wherein said marking device comprises a positive lens and a diaphragm arranged in the focal plane of said positive lens.

5. A comparator viewing device as defined in claim 1 or 2, wherein at least one of said occular lenses of said binocular tube comprises an interchangeable graticule member.

6. A comparator viewing device as defined in claim 2, wherein said marking device comprises a beam deflecting element displaceably arranged in said phototube.

* * * * *